J. N. WILKIN.
HARROW.
APPLICATION FILED MAY 14, 1920.
1,425,819.
Patented Aug. 15, 1922.
2 SHEETS—SHEET 1.
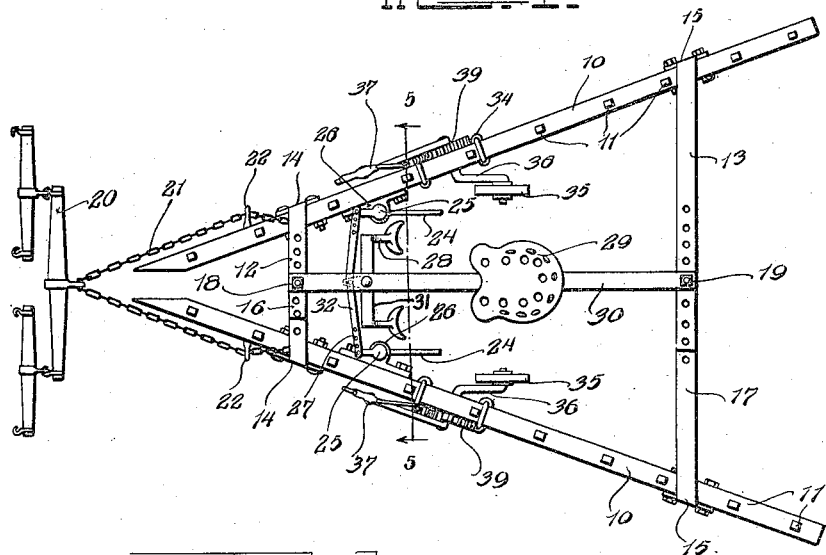
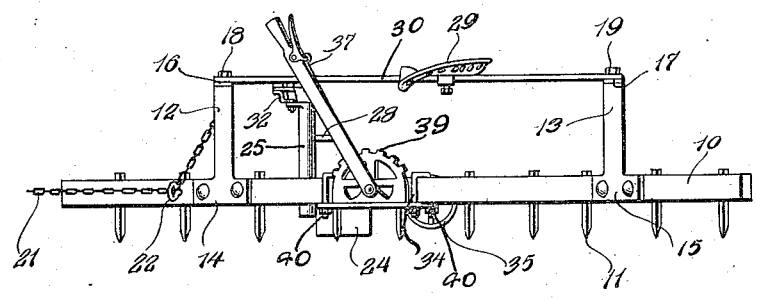
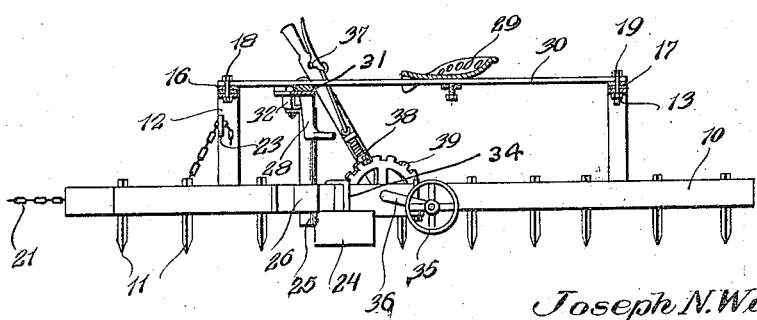
Joseph N. Wilkin
INVENTOR
BY Victor J. Evans
ATTORNEY
WITNESS:

J. N. WILKIN.
HARROW.
APPLICATION FILED MAY 14, 1920.
1,425,819.
Patented Aug. 15, 1922.
2 SHEETS—SHEET 2.
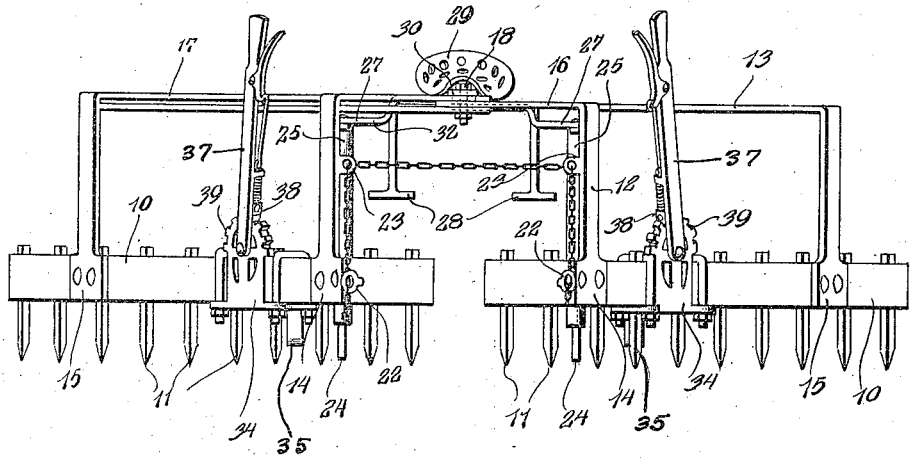
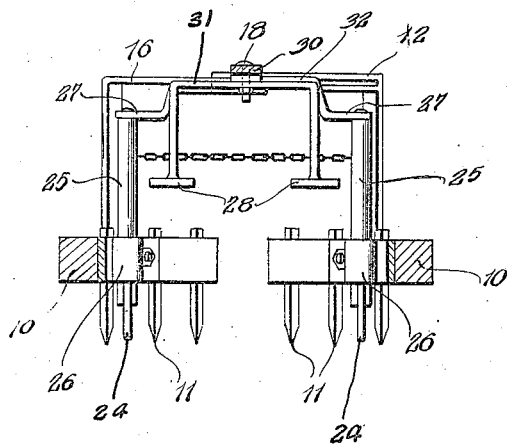
Joseph N. Wilkin
INVENTOR
BY
ATTORNEY
WITNESS:

UNITED STATES PATENT OFFICE.

JOSEPH N. WILKIN, OF HILLSBORO, OHIO.

HARROW.

1,425,819.  Specification of Letters Patent.  Patented Aug. 15, 1922.

Application filed May 14, 1920. Serial No. 381,415.

*To all whom it may concern:*

Be it known that I, JOSEPH N. WILKIN, a citizen of the United States, residing at Hillsboro, in the county of Highland and State of Ohio, have invented new and useful Improvements in Harrows, of which the following is a specification.

The object of the invention is to provide a simple, relatively inexpensive and efficient harrow wherein the driver may control the direction of movement thereof by foot pressure applied conveniently from a driver's seat located in such relation to the harrow teeth or cultivating elements as to facilitate the engagement thereof with the ground, and also in this connection to provide simple means whereby the spread or lateral zone of operation of the harrow may be varied at the will of the operator and so as to modify as may be required the draft resistance and the character of the crops to be cultivated.

With these objects in view the invention consists in a construction and combination of parts of which a preferred embodiment is shown in the accompanying drawings, wherein:

Figure 1 is a plan view of the harrow.
Figure 2 is a side view of the same.
Figure 3 is a longitudinal section.
Figure 4 is a front view.
Figure 5 is a detail transverse sectional view on the plane indicated by the line 5—5 of Figure 1, to show the steering means and the manner in which the elements thereof are mounted.

The apparatus consists essentially of the rearwardly divergent harrow bars or beams 10 carrying the harrow teeth 11 which obviously may be of any desired construction, said beams being connected by transverse front and rear arches 12 and 13 which span the interval between the beams and have their uprights or terminals secured by clamps 14 and 15 to the beams, the cross bars 16 and 17 being of extensible construction and each consisting of male and female members secured at the desired relative adjustment to suit the spread of the harrow beams by means of set screws 18 and 19. In the construction illustrated the draft apparatus for use in connection with the mechanism consists of double trees 20 which are located at opposite sides of the center line of movement or path of the harrow and are connected by a chain or cable 21 which preferably extends through guides 22 located on the beams respectively near their front ends and similar guides 23 which are located on the uprights of the front arch, it being preferred to have the double trees connected in such a way as to secure an equalization of draft and hence by a running element which extends from one to the other.

The guiding or steering means for the apparatus consist of blades 24 of which the spindles 25 are mounted in suitable bearings 26 carried respectively by the beams, and secured to said spindles by means of adjustable clamps 27 are treadles 28 which are arranged within convenient reach of the driver occupying the seat or saddle 29 supported by a longitudinal bar 30 which extends from the front to the rear arch and is supported thereby. The saddle is preferably adjustable upon the supporting bar 30 and the cross heads 31 which carry the treadles or foot rests 28 are connected transversely, for simultaneous movement by a link 32, so that when one treadle or foot rest is moved to vary the position of the steering blades, both of said blades are moved correspondingly and simultaneously and to the same extent to give the required direction of movement to the harrow.

Also mounted upon the side beams of the structure by means of clamps 34 are supporting or depth regulating wheels 35 connected with crank axles 36 to which are connected adjusting levers 37 carrying pawls 38 for engagement with segmental racks 39, so that the positions of the rollers with reference to the horizontal plane of the harrow beams may be varied, and said wheels secured at the desired adjustment and in addition the clamps 34 upon which said wheel supporting crank axles are mounted are adjustable upon the beams, relative to the links thereof, and are adapted to be secured at the desired adjustment by means of set screws 40, so that the position of the depth regulating supporting elements with reference to the weight of the machine supplemented by that of the driver may be adjusted to cause the most efficient engagement of the harrow teeth with the soil in accordance with the function to be performed by the device. In other words, by adjusting the clamps 34 rearwardly on the beams a tendency for the front ends of said beams to be depressed is produced, an adjustment in the opposite direction having the reverse result, and in this way the operator may regulate the running or traveling support of the beams to suit the conditions and the adjustment of the saddle or seat 29 with reference to the length of the beams, and at the same time by the lever 37 the depression of said ground wheels may be varied to cause the desired penetration of the soil by the harrow teeth.

Having described the invention what is claimed is:—

1. A harrow comprising a pair of rearwardly diverging beams carrying teeth and provided with draft means, a pair of transverse arch members secured to and connecting said means and extending upwardly thereabove, said arch members being independently adjustable whereby to vary the angular inclination of the teeth with respect to each other, a longitudinally extending bar connecting said arch members, and a seat mounted on the bar.

2. A harrow comprising a pair of rearwardly diverging beams carrying harrow teeth and provided with draft means, a pair of arch members connecting said beams near their forward and rear ends and each including a pair of L-shaped bars secured to the outer sides of the beams and including horizontal portions arranged in overlapping relation and provided with a series of holes, a longitudinal bar disposed upon the top of said arch members and carrying a seat, and screws passing through the ends of said bar and through selected aligning ones of said holes whereby the arch members may be independently adjusted whereby to vary the angular inclination of the beams with respect to each other.

3. A harrow comprising a pair of beams carrying harrow teeth, forward and rear arch members connecting said beams, and draft means comprising chains secured at their ends to the sides of the forward arch member, outwardly extending guide members near the forward ends of the beams through which said trained chains are trained, and a draft device proper connected with the forward extremities of said chains.

In testimony whereof I affix my signature.

JOSEPH N. WILKIN.